United States Patent
Zhang et al.

(10) Patent No.: US 10,108,252 B2
(45) Date of Patent: Oct. 23, 2018

(54) METHOD AND SYSTEM FOR INTELLIGENT LOAD LINE CONTROL OF INFORMATION HANDLING SYSTEMS

(71) Applicant: Dell Products L.P., Round Rock, TX (US)

(72) Inventors: Kejiu Zhang, Round Rock, TX (US); Shiguo Luo, Austin, TX (US); Ralph H. Johnson, III, Round Rock, TX (US); Hang Li, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 205 days.

(21) Appl. No.: 15/060,312

(22) Filed: Mar. 3, 2016

(65) Prior Publication Data

US 2017/0255251 A1 Sep. 7, 2017

(51) Int. Cl.
*G06F 1/26* (2006.01)
*G06F 1/32* (2006.01)

(52) U.S. Cl.
CPC .............. *G06F 1/3296* (2013.01); *G06F 1/26* (2013.01)

(58) Field of Classification Search
CPC .................................................. G06F 1/3296
USPC ........................................................ 713/320
See application file for complete search history.

(56) References Cited

U.S. PATENT DOCUMENTS

| | | | |
|---|---|---|---|
| 7,642,764 B2 | 1/2010 | Burton et al. | |
| 8,097,979 B2 | 1/2012 | Berke et al. | |
| 8,402,294 B2 | 3/2013 | Burton | |
| 2003/0137787 A1* | 7/2003 | Kumar | G06F 1/26 361/18 |
| 2003/0226043 A1* | 12/2003 | Hicok | G06F 1/3203 713/300 |
| 2012/0123914 A1* | 5/2012 | Sharma | H04M 15/00 705/30 |

\* cited by examiner

*Primary Examiner* — Jaweed A Abbaszadeh
*Assistant Examiner* — Sumil M Desai
(74) *Attorney, Agent, or Firm* — Baker Botts L.L.P.

(57) ABSTRACT

A voltage regulator for delivering power to a processor subsystem within an information handling system is disclosed. The voltage regulator includes an interface to an embedded controller for receiving a linear load line impedance and an intelligent load line controller. The intelligent load line controller may enable linear load line control, determine that a nonlinear load line condition is satisfied, and enable nonlinear load line control based on the determination that the nonlinear load line condition is satisfied.

20 Claims, 6 Drawing Sheets

METHOD AND SYSTEM FOR INTELLIGENT LOAD LINE CONTROL OF INFORMATION HANDLING SYSTEMS

BACKGROUND

Field of the Disclosure

This disclosure relates generally to information handling systems and more particularly to intelligent load-line control.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may process, store, and communicate information and may include one or more computer systems, data storage systems, and networking systems.

The use of embedded controllers in information handling systems has increased in recent years. Broadly speaking, an embedded controller (EC) may be a device, system, or apparatus for remote monitoring or management of an information handling system. The embedded controller may be a secondary information handling system embedded in the information handling system. This secondary information handling system, in the form of the embedded controller, may include additional functionality. Likewise, the transient demands and power efficiency requirements of voltage regulators in information handling systems has increased in recent years. A voltage regulator may be a device, system, or apparatus for providing voltage to an information handling system.

SUMMARY

In one aspect, a disclosed method includes enabling linear load line control by setting a linear load line impedance, wherein the linear load line impedance is based on a load factor of a processor subsystem. The method may include determining that a second range condition corresponding to a second range nonlinear load line impedance is satisfied, wherein the second range nonlinear load line impedance is greater than or equal to both the linear load line impedance and a first range load line impedance. The method may also include enabling nonlinear load line control by setting the second range nonlinear load line impedance based on the determination that the second range condition is satisfied wherein nonlinear load line control with the second range nonlinear load line impedance has a piecewise linear response.

In certain embodiments, the method includes satisfying the second range condition by measuring a load current of the processor subsystem, computing a hysteresis load limit based on a load current threshold and a hysteresis factor, and determining that the measured load current is less than the hysteresis load limit.

Another disclosed aspect includes an information handling system, comprising a processor subsystem having access to a first memory, and an embedded controller comprising a secondary processor having access to a second memory, the second memory storing instructions executable by the secondary processor.

A further disclosed aspect includes a voltage regulator for delivering power to a processor subsystem within an information handling system, the voltage regulator comprising an interface to an embedded controller and an intelligent load line controller. The interface may be for receiving a linear load line impedance based on a load factor. The load factor may be determined by the information read from the processor subsystem. The intelligent load line controller includes logic to enable linear load line control by sending the linear load line impedance and determine a first range nonlinear load line impedance corresponding to the linear load line impedance, logic to determine that a second range condition corresponding to a second range nonlinear load line impedance is satisfied, and logic to enable nonlinear load line control by setting the second range nonlinear load line impedance based on the determination that the second range condition is satisfied wherein nonlinear load line control with the second range nonlinear load line impedance has a piecewise linear response. The second range nonlinear load line impedance may be greater than or equal to both the linear load line impedance and the first range nonlinear load line impedance.

An additional disclosed aspect includes an article of manufacture comprising a non-transitory computer-readable medium storing instructions executable by a secondary processor, while an information handling system comprises a processor subsystem and the second processor.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
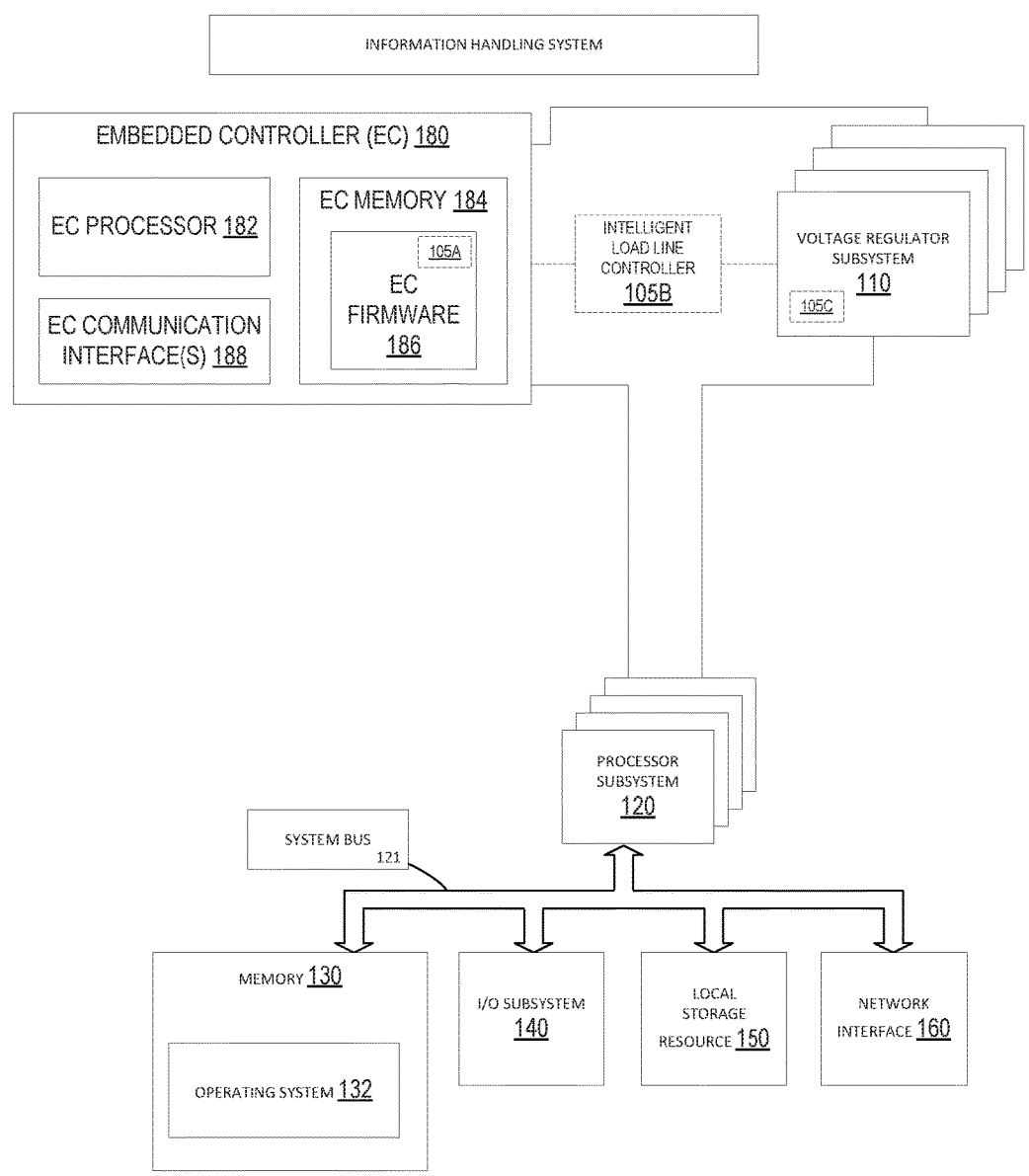
FIG. 1 is a block diagram of selected elements of an embodiment of an information handling system including intelligent load line control, according to the present disclosure.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a server, a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Additionally, the information handling system may include firmware for controlling and/or communicating with, for example, hard drives, network circuitry, memory devices, I/O devices, and other peripheral devices. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-6 wherein like numbers are used to indicate like and corresponding parts.

Turning now to the drawings, FIG. 1 illustrates a block diagram depicting selected elements of an embodiment of information handling system 100. As shown in FIG. 1, components of information handling system 100 may include, but are not limited to, voltage regulator subsystem 110, processor subsystem 120, and system bus 121 that communicatively couples various system components to processor subsystem 120 including, for example, memory 130, I/O subsystem 140, local storage resource 150, and network interface 160. Voltage regulator subsystem 110, which may comprise one or more voltage regulators, may represent a variety of suitable types of voltage regulators or voltage controllers, including a voltage regulator down, a voltage regulator module, a buck converter, and/or a buck regulator. Voltage regulator subsystem 110 may interface with processor subsystem 120 to deliver power, and to read and write information related to power delivery. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 may be a suitable system, apparatus, or device operable to serve as an interface between information handling system 100 and a network (not shown). Network interface 160 may enable information handling system 100 to communicate over the network using a suitable transmission protocol and/or standard. In some embodiments, network interface 160 may be communicatively coupled via the network to a network storage resource. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). The network may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof.

As depicted in FIG. 1, processor subsystem 120, which may comprise one or more processors, may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. Each processor in the processor subsystem 120 may contain one or more cores or functional units for performing tasks. In some embodiments, processor subsystem 120 may interpret and/or execute program instructions and/or process data stored locally (e.g., in memory 130 and/or another component of physical hardware 102). In the same or alternative embodiments, processor subsystem 120 may interpret and/or execute program instructions and/or process data stored remotely (e.g., in a network storage resource).

Also in FIG. 1, memory 130 may comprise a system, device, or apparatus operable to retain and/or retrieve program instructions and/or data for a period of time (e.g., computer-readable media). As shown in the example embodiment of FIG. 1, memory 130 stores operating system 132, which may represent instructions executable by processor subsystem 120 to operate information handling system 100 after booting. It is noted that in different embodiments, operating system 132 may be stored at the network storage resource and may be accessed by processor subsystem 120 via the network Memory 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as information handling system 100, is powered down.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. For example, local storage resource 150 may store executable code in the form of program files that may be loaded into memory 130 for execution, such as operating system 132. In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. For example, I/O subsystem 140 may include a Peripheral Component Interconnect Express (PCI-E) interface that is supported by processor subsystem 120. Often I/O subsystem 140 is referred to as a "chipset" to indicate a collection of integrated circuits that are usable with a given implementation of processor subsystem 120.

Also shown in FIG. 1 is embedded controller (EC) 180, which may include EC processor 182 as a second processor included with information handling system 100 certain management tasks, including intelligent load line control, as disclosed herein. EC processor 182 may have access to EC memory 184, which may store EC firmware 186, representing instructions executable by EC processor 182. EC firmware 186 may represent load line control instructions executable by EC processor 182, for example, preparing information handling system for intelligent load line control and preparing information handling system 100 to boot by activating various hardware components in preparation of launching operating system 132 for execution (also referred to as a basic input/output system (BIOS)). In certain embodiments, EC firmware 186 includes a Unified Extensible Firmware Interface (UEFI) according to a specification promulgated by the UEFI Forum (uefi.org). Embedded controller 180 may execute EC firmware 186 on EC processor 182 even when other components in information handling system 100 are inoperable. Furthermore, EC firmware 186 may be in control of EC communication interface (s) 188, which may represent one or more input/output interfaces or signals that embedded controller 180 can use to communicate with other elements of information handling system 100.

In operation, when information handling system 100 is powered on, booted, or rebooted (i.e., started or restarted), EC firmware 186 may detect the power on event and may proceed to perform a power on self-test (POST), while activating various hardware components in the process. In one embodiment, EC firmware 186 may enable intelligent load line controller 105A to assist in providing power delivery to the processor subsystem. Embedded controller 180 may interface with voltage regulator subsystem 110 to support power delivery to the processor subsystem 120. In another embodiment, intelligent load line controller 105B may reside external to embedded controller 180, and may interface with embedded controller 180 and voltage regulator subsystem 110 to support power delivery to processor subsystem 120. In a further embodiment, intelligent load line controller 105C may reside within voltage regulator subsystem 110, and may interface with embedded controller 180 to support power delivery to the processor subsystem 120. Intelligent load line controller 105 may be implemented using a microprocessor, microcontroller, digital signal processor (DSP), application specific integrated circuit (ASIC), or another digital or analog circuitry.

Transient events may frequently or even constantly occur on information handling system 100. For example, if an application and/or instruction begins execution, the load current may increase nearly instantaneously, causing strain on the voltage controller subsystem to deliver a voltage to processor subsystem 120 such that the processor subsystem maintains stable operation. Intelligent load line controller 105 may leverage the infrequency of worst case transients in information handling system 100. Transients smaller than a worse case event may enable intelligent load line controller 105 to operate the processor subsystem 120 using a more aggressive load line impedance to achieve a lower median voltage while maintaining the stability of processor subsystem 120.

Figure 2:
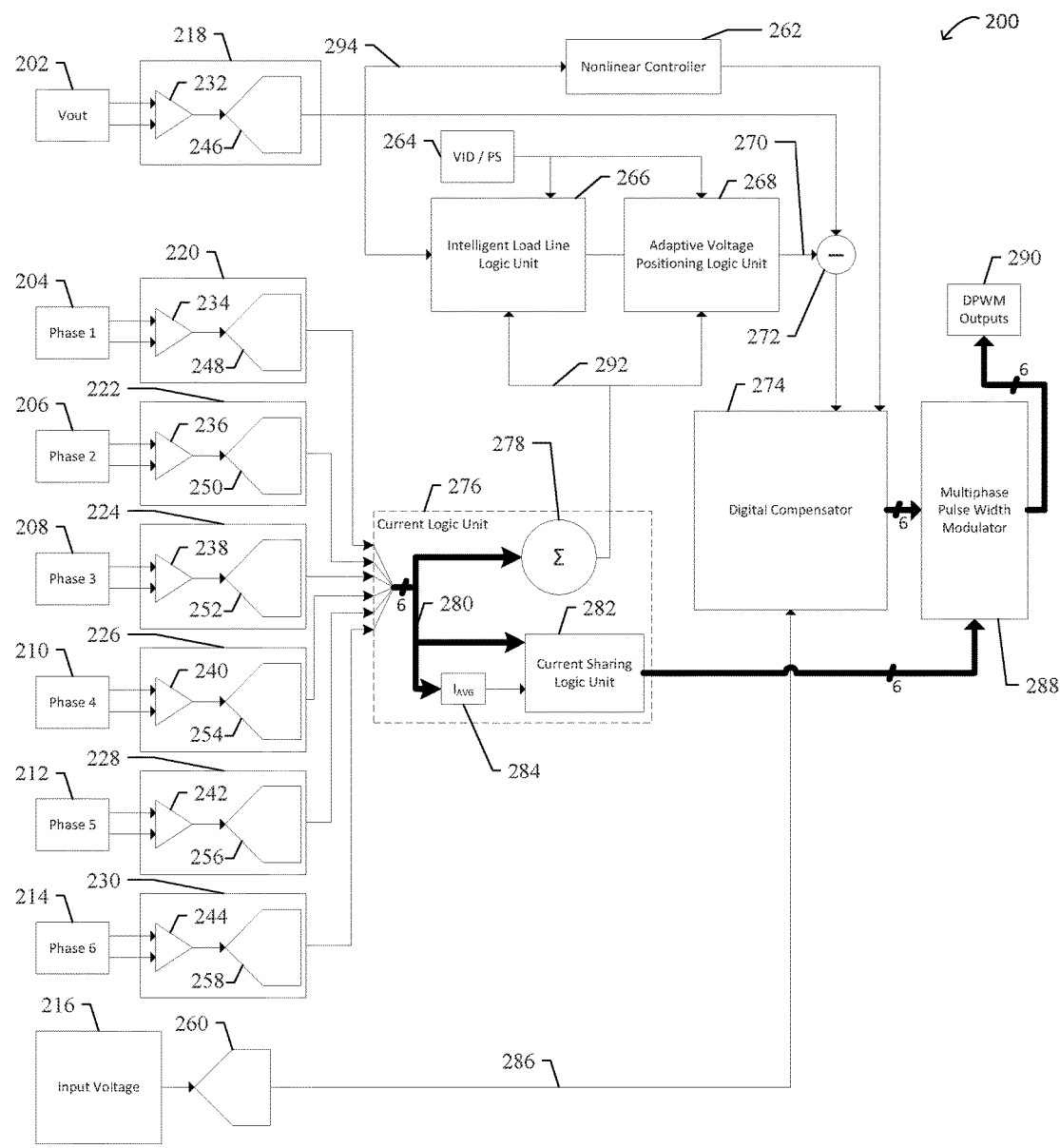
FIG. 2 is a block diagram of a voltage controller including intelligent load line control, in accordance with embodiments of the present disclosure.

Referring now to FIG. 2, a block diagram of a voltage controller including intelligent load line control is shown, in accordance with embodiments of the present disclosure. Voltage controller 200 may implement, fully or in part, voltage regulator subsystem 110. Voltage controller 200 may include other components not shown, including but not limited to one or more voltage buck converters, and/or one or more output drivers. In some embodiments, functions performed by voltage controller 200 may be performed by an external device.

Voltage controller 200 may include one or more phases for power delivery. In one embodiment, each processor in processor subsystem 120 may contain one or more voltage controllers. In another embodiment, processor subsystem 120 may use the same voltage controller 200. The current delivered by each phase may be sensed and provided as a differential input to voltage controller 200. The current may be sensed through an inductor DCR or an integrated power stage. Each differential analog current sense value may be amplified and converted to a single-ended input for an analog-to-digital converter (ADC). The ADC may convert the analog single-ended current sense value into a digital value. For example, voltage controller 200 may have six phases 204, 206, 208, 210, 212, and 214. Phases one through six may be converted from analog to digital form using six conversion units 220, 222, 224, 226, 228, and 230. Within the conversion units, phases one through six may be converted from a differential analog value to a single-ended analog value using amplifiers 234, 236, 238, 240, 242 and 244. Moreover, within the conversion units, phases one through six may be converted from a single-ended analog value into a digital value using analog-to-digital converters (ADCs) 248, 250, 252, 254, 256, and 258.

The digital values representing the sensed current for each phase may be input to a current logic unit 276. Current logic unit 276 may include a summation unit 278, which may sum the sensed current from all phases 280 to generate a total load current 292. Moreover, current logic unit 276 may calculate $I_{AVG}$ 284, the average current for all phases. In one embodiment, $I_{AVG}$ 284 may be calculated based on the total load current 292 and the number of phases in voltage controller 200. Both the digital values representing the sensed current from all phases 280 and $I_{AVG}$ 284 may be input into a current sharing logic unit 282. Current sharing logic unit 282 may balance the current delivered across all phases such that no individual phase is loaded unevenly. Current sharing logic unit 282 may operate at a fraction of the voltage loop bandwidth of the voltage controller 200. For example, the voltage loop bandwidth may be 100 kHz and the current sharing logic unit 282 may operate at one-fifth of the voltage loop bandwidth or 20 kHz to achieve an appropriate sharing of current between the phases. Current sharing logic unit 282 may output the balanced current information to a multiphase pulse width modulator (PWM) 288.

Voltage controller 200 may also have an input representing the voltage output, $V_{out}$, from the voltage controller 200. $V_{out}$ 202 may be sensed and provided as a differential analog input to the voltage controller 200. The differential analog sensed voltage may be converted to a digital value in conversion unit 218. Conversion unit 218 may include an amplifier 232, which may convert the differential analog signal to a single-ended analog signal, and an ADC 246, which may convert a single-ended analog signal into a digital value. Nonlinear controller 262 may receive the measured $V_{out}$ 294, which is the digital value. Nonlinear controller 262 may assist with non-linear PWM generation along with digital compensator 274 and multiphase PWM 288. Intelligent load line logic unit 266 may receive measured $V_{out}$ 294, total load current 292, voltage identification (VID) and/or power state (PS) 264, and/or information from adaptive voltage positioning logic unit 268. Intelligent load line logic unit 266 may determine the appropriate load line for processor subsystem 120. Intelligent load line logic unit 266 may provide an appropriate load line impedance to the adaptive voltage positioning logic unit 268 to calculate the desired $V_{target}$ 270.

Furthermore, adaptive voltage positioning logic unit 268 may receive total load current 292 and voltage identification (VID) and/or power state (PS) 264. Total load current 292 may be filtered by adaptive voltage positioning logic unit 268 or by summation unit 278. VID and/or PS 264, or collectively requested power value 264, may be received from processor subsystem 120. Adaptive voltage positioning logic unit 268 or the voltage controller more generally may decode the VID and/or PS 264 into a requested voltage and/or power state respectively. VIDs may correspond to discrete, quantized voltages supplied to the processor subsystem. Power states may correspond to defined functions that processor subsystem 120 may communicate to voltage regulator subsystem 110. For example, a first power state may correspond to the processor operating at a highest power capability value, and may be equivalent to a load above 50 or 90 Amps. A second power state may correspond to processor subsystem 120 operating at a lower power capability value relative to the first power state, and may be equivalent to a load above 5 or 30 Amps. A third power state may correspond to processor subsystem 120 operating at an even lower power capability value relative to the second power state, and may be equivalent to loads below 5 or 30 Amps. Information handling system may have any number of suitable power states. Moreover, a first power state may correspond to the highest power capability value or the lowest power capability value. Voltage controller 200 may respond to a lower power capability power state by performing any number of suitable operations to increase efficiency and/or to save power, including reducing the switching frequency, switching to another mode of operation, reducing the number of phases used in power delivery, and/or adjusting the load line impedance. Voltage controller 200 may return to the highest power capability power state automatically when it receives an increased VID from the processor subsystem 120.

Adaptive voltage positioning logic unit 268 may also calculate $V_{target}$ via the following equation:

$$V_{target} = VID - I_{LOAD} \times R_{LL} \quad (1)$$

in which, VID may be VID 264, $I_{LOAD}$ may be total load current 292, and $R_{LL}$ may be an appropriate load line impedance determined by intelligent load line logic unit 266. A load line impedance of 0, resulting in $V_{target}$ being equivalent to VID, may correspond to voltage positioning without a load line. For voltage positioning with a load line, a load line impedance may be defined to be any suitable value. For example, an information handling system with a maximum power of approximately 150 Watts may have a load line impedance of 1.0 mΩ.

In one embodiment, intelligent load line logic unit 266 may receive the decoded VID and/or power state from the adaptive voltage positioning logic unit 268. In another embodiment, intelligent load line logic unit 266 may receive the encoded VID and/or power state 264 directly and may decode the received value. Intelligent load line logic unit 266 may compare the most recent decoded VID and/or power state to the previous decoded VID and/or power state to determine whether the load line impedance should be adjusted. For example, if the decoded VID and/or power state corresponds to a higher load current capability, intelligent load line logic unit 266 may adjust the load line to be less steep with a smaller $R_{LL}$ value or smaller load line impedance. Otherwise, if the decoded VID and/or power state corresponds to a lower load current capability, intelligent load line logic unit 266 may adjust the load line to be more steep with a larger $R_{LL}$ value or a larger load line impedance. In another embodiment, adaptive voltage positioning logic unit 268 may perform the comparison between the most recent decoded VID and/or power state and provide the result or results to intelligent load line logic unit 266.

Adaptive voltage positioning logic unit 268 may output $V_{target}$ 270 to subtraction unit 272, which may subtract measured $V_{out}$ 294 from $V_{target}$ 270 to determine the voltage adjustment, which may be received by digital compensator 274. Moreover, digital compensator 274 may receive an input voltage feedforward 286. Input voltage 216 may be converted to a digital value by ADC 260 to represent input voltage feedforward 286. In one embodiment, input voltage may be the reference voltage, $V_{bus}$ or $V_{ref}$, provided to voltage controller 200. For example, the reference voltage for voltage controller 200 may be 12V in magnitude. In another embodiment, input voltage 216 may represent the output from a multiplexer switching between various reference voltages. Digital compensator 274 may use input voltage feedforward 286 to compensate for input voltage variation. Digital compensator 274 may perform the input voltage compensation by adjusting the ramp slope of the PWM output along with multiphase PWM 288. Digital compensator 274 may filter the error voltage, which may be generated from a variety of sources, including but not limited to outputs from an ADC and/or the adaptive voltage positioning logic unit 268. Multiphase PWM 288 may generate digital PWM (DPWM) outputs 290 based on the output from the digital compensator 274 and the current sharing logic unit 282. DPWM outputs 290 may control an output driver unit delivering power to the processor subsystem 120.

Figure 3:
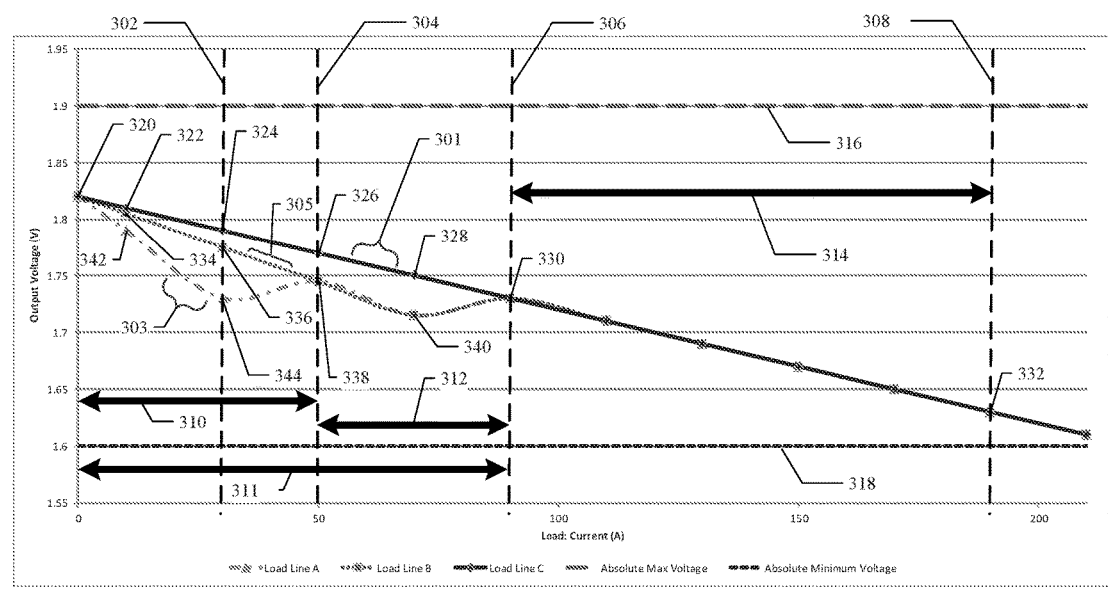
FIG. 3 is a graphical representation of intelligent load line control of an information handling system, in accordance with embodiments of the present disclosure.

Referring now to FIG. 3, a graphical representation of intelligent load line control of an information handling system, in accordance with some embodiments of the present disclosure is shown. A voltage may be output to a processor subsystem 120 of an information handling system. An information handling system may operate between an absolute maximum voltage 316, and an absolute minimum voltage 318. A linear load line 301 may include values 320, 322, 324, 326, 328, 330, and 332 along a sloped line representing a linear function. The linear load line may be represented by Equation (1). A linear load line 301 may be defined such that the maximum voltage 320 is less than the absolute maximum voltage 316 and the minimum voltage 332 at maximum load current 308 is greater than the absolute minimum voltage 318. Such a definition may ensure that processor subsystem 120 operates properly at all possible load currents.

Intelligent load line control may remain between the absolute maximum voltage 316 and the absolute minimum voltage 318 across all load currents equal to or less than maximum load current 308. Intelligent load line control may include linear load line control and nonlinear load line control. Linear load line control may be equivalent to static load line control. Nonlinear load line control may be approximated with piecewise linear functions and may be equivalent to dynamic load line control. Each piecewise linear function may correspond to a sloped line across a range of load currents. In one embodiment, nonlinear load line 303 may include range 311 and range 314. A first range 314 of nonlinear load line control may be defined between load current 306 and maximum load current 308. First range 314 may correspond to an impedance similar to linear load line control, resulting in nonlinear load line voltage and linear load line voltage 330 being comparable. A second range 311 of nonlinear load line control may be defined for all loads equal to or less than load current 306. Second range 311 may correspond to a load line impedance greater than the linear load line impedance, and include values 334, 336, 338, and 340. For example, the second range load line impedance may be 50% greater than the linear load line impedance, resulting in nonlinear load line voltage 340 being 35 mV lower than linear load line voltage 328.

In another embodiment, nonlinear load line 305 may include ranges 310, 312, and 314. A first range 314 of nonlinear load line control may be defined between load current 306 and maximum load current 308. A second range 312 of nonlinear load line control may be defined for loads between load current 304 and load current 306. Second range 312 may correspond to a load line impedance greater than or equal to the linear load line impedance, and include values 338 and 340. Furthermore, a third range 310 of nonlinear load line control may be defined for all loads equal to or less than load current 304, including values 342 and 344. Third range 310 may correspond to a load line impedance greater than or equal to the linear load line impedance, greater than or equal to the first range nonlinear load line impedance, and greater than or equal to the second range nonlinear load line impedance. For example, the third range load line impedance may be 300% greater than the linear load line impedance, resulting in nonlinear load line voltage 344 being 60 mV lower than linear load line voltage 324 at load current 302. Furthermore, nonlinear load line voltage 344, associated with the third range, may also be 45 mV lower than nonlinear load line voltage 336, associated with the second range in other embodiments. In a further embodiment, nonlinear load line control may include a plurality of ranges, each with a defined load line impedance that is equal to or greater than the load line impedance for the adjacent range corresponding to greater load currents. In yet another embodiment, nonlinear load line control may define unique load line impedances corresponding to each possible VID and/or power state, which the load line impedance may change with each requested VID and/or power state.

Figure 4:
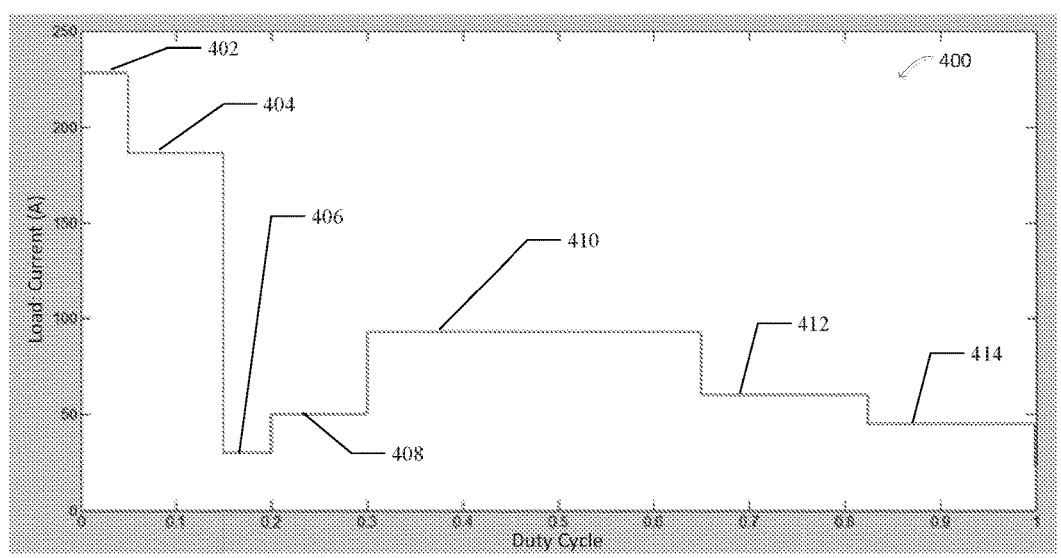
FIG. 4 is a graphical representation of a dynamic load envelope of an information handling system, in accordance with embodiments of the present disclosure.

Referring now to FIG. 4, a graphical representation of a nonlinear load envelope 400 of an information handling system is shown, in accordance with some embodiments of the present disclosure. The load current of information handling system 100 may vary over an envelope corresponding to varying levels of activity and/or a variety of applications. The total power consumption of a voltage of the information handling system associated with a nonlinear load envelope may be calculated by the following equation:

$$P = \Sigma V_i \times I_i \times DT_i = \Sigma (VID_i - I_i \times LL_i) \times I_i \times DT_i \qquad (2)$$

in which, P may represent the total power consumption associated with the nonlinear load envelope, i may represent the individual measurements across the envelope, V may represent the voltage of the information handling system, I may represent the load current of the information handling system associated the voltage, VID may represent the voltage identifier, LL may correspond to the load line impedance at the given load current, and DT may represent the duty cycle associated with a particular load current.

The load current may be a function of several factors, including the voltage input to the processor, the temperature of the processor, the state of the processor, and the instructions and/or functions being executed on the processor. At 402, information handling system 100 may operate at a maximum possible load at a maximum possible processor state for a duty cycle of 0.05. At 404, information handling system 100 may operate at a high load at a maximum possible processor state for a particular set of instructions or software applications for a duty cycle of 0.1. At 406, the information handling system 100 may operate at a low load at a low processor state for a duty cycle of 0.05. At 410, information handling system 100 may operate at a high load at an elevated processor state for a duty cycle of 0.35. At 412, information handling system 100 may operate at a maximum sustained load at a normal processor state for a duty cycle of 0.175. Information handling system 100 may also operate at other intermediate loads during 408 and 414. Intelligent load line control may enable several watts of power savings for an information handling system. For example, intelligent load line control based on the nonlinear load line control in FIG. 3 may enable between 3.9 and 4.2 W of power savings per processor within processor subsystem 120 of information handling system 100.

Figure 5A:
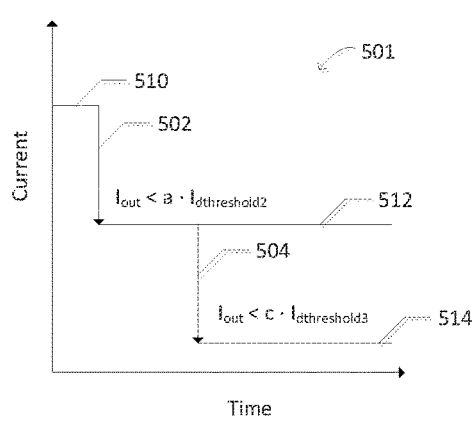
FIG. 5A is a graphical representation of a hysteresis current monitor for an increased load on an information handling system, in accordance with embodiments of the present disclosure.

Referring now to FIG. 5A, a graphical representation of a hysteresis current monitor of an intelligent load line logic unit for reductions in load currents 501 on an information handling system is shown, in accordance with embodiments of the present disclosure. Hysteresis current monitor may reside within intelligent load line controller 105. Hysteresis current monitor prevents an intelligent load line logic unit from repeatedly switching load line impedances when a load current repeatedly increases or decreases in value around a load current threshold. For example, without a hysteresis current monitor, intelligent load line logic unit 266 may increase the impedance by 100% in response to an increase in load current of only 1 amp. On the next update, intelligent load line logic unit 266 may decrease the impedance back down to the original value before the 100% increase in response to a decrease in load current of only 1 amp. This unwanted rapid and/or repeated switching may increase the amount of stress on the voltage controller or related components. Moreover, it may reduce the amount of power savings capable with intelligent load line control. With a hysteresis current monitor, however, a load current threshold may be multiplied by a predetermined value before a comparison to the measured load current. The calculation may be represented by the following equation:

$$I_{out} < \alpha \times I_{threshold} \tag{3}$$

in which, $I_{out}$ is the measured load current, a is the hysteresis factor, and $I_{threshold}$ is the load current threshold. The hysteresis factor and/and the load current threshold may be predetermined for intelligent load line control.

In one embodiment, intelligent load line logic unit may be operating in a first range of nonlinear load line control associated with load current 510. The first range may be represented by range 314. At 502, for example, the load current may decrease from 510 to 512. Decreases in current may occur when the information handling system completes handling information. Hysteresis current monitor may multiply the load current threshold for a second range $I_{dthreshold2}$ by hysteresis factor a, which may be equal to 1.0, and may compare the product or the hysteresis limit to the measured load current $I_{out}$. If the measured load current 512 is less than the hysteresis limit, hysteresis current monitor may indicate that a greater impedance may be used by entering the second range of nonlinear load line control. If the measured load current 512, however, is equal to or greater than the hysteresis limit, hysteresis current monitor may indicate that the impedance should remain unchanged. The second range may be represented by range 311 or 312.

In another embodiment, intelligent load line logic unit may be operating in a second range of nonlinear load line control associated with load current 512. At 504, for example, the load current may decrease from 512 to 514. Hysteresis current monitor may multiply the load current threshold for a second range $I_{dthreshold3}$ by hysteresis factor c, which may be equal to 1.01, and may compare the hysteresis limit to the measured load current $I_{out}$. If the measured load current 514 is less than the hysteresis limit, hysteresis current monitor may indicate that a greater impedance may be used by entering the third range of nonlinear load line control. If the measured load current 514, however, is equal to or greater than the hysteresis limit, hysteresis current monitor may indicate that the impedance should remain unchanged. The third range may be represented by range 310. Intelligent load line control may transition between the first range, second range, and third range in any suitable order, including direct transition from the first range to the third range, skipping over the second range.

Figure 5B:
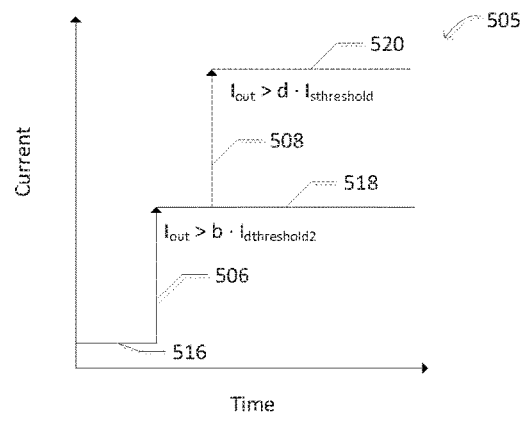
FIG. 5B is a graphical representation of a hysteresis current monitor for a decreased load on an information handling system, in accordance with embodiments of the present disclosure.

Referring now to FIG. 5B, a graphical representation of a hysteresis current monitor of an intelligent load line logic unit for increases in load currents 505 on an information handling system is shown, in accordance with embodiments of the present disclosure. In one embodiment, intelligent load line logic unit may be operating in a third range of nonlinear load line control associated with load current 516. The third range may be represented by range 310. At 506, for example, the load current may increase from 516 to 518. Increases in load current may occur when the information handling system begins to handle information. Hysteresis current monitor may multiply the load current threshold for a second range $I_{dthreshold2}$ by hysteresis factor b, which may be equal to 1.1, and may compare the hysteresis limit to the measured load current $I_{out}$. If the measured load current 518 is greater than the hysteresis limit, hysteresis current monitor may indicate that a reduced impedance may be used by entering the second range of nonlinear load line control. If the measured load current 518, however, is equal to or less than the hysteresis limit, hysteresis current monitor may indicate that the impedance should remain unchanged. The second range may be represented by range 312.

In another embodiment, intelligent load line logic unit may be operating in a second range of nonlinear load line control associated with load current 518. The second range associated with load current 518 may be represented by range 311 or 312. At 508, for example, the load current may increase from 518 to 520. Hysteresis current monitor may multiply the load current threshold for a first range of nonlinear load line control or the threshold for linear load line control $I_{sthreshold}$ by hysteresis factor d, which may be equal to 1.05, and may compare the pro hysteresis limit duct to the measured load current $I_{out}$. If the measured load current 520 is greater than the hysteresis limit, hysteresis current monitor may indicate that a reduced impedance may be used by entering the first range of nonlinear load line control or in other embodiments entering linear load line control. If the measured load current 520, however, is equal to or less than the hysteresis limit, hysteresis current monitor may indicate that the impedance should remain unchanged. The first range may be represented by range 314.

By defining hysteresis factors b and d to be greater than c and a respectively, hysteresis current monitor may avoid unwanted rapid and/or repeated changes in the load line impedance generated by intelligent load line logic unit. Moreover, by defining b and d to be greater than c and a respectively, hysteresis current monitor may favor power savings. Intelligent load line logic unit may define additional hysteresis factors for each range in nonlinear load line control.

Figure 6:
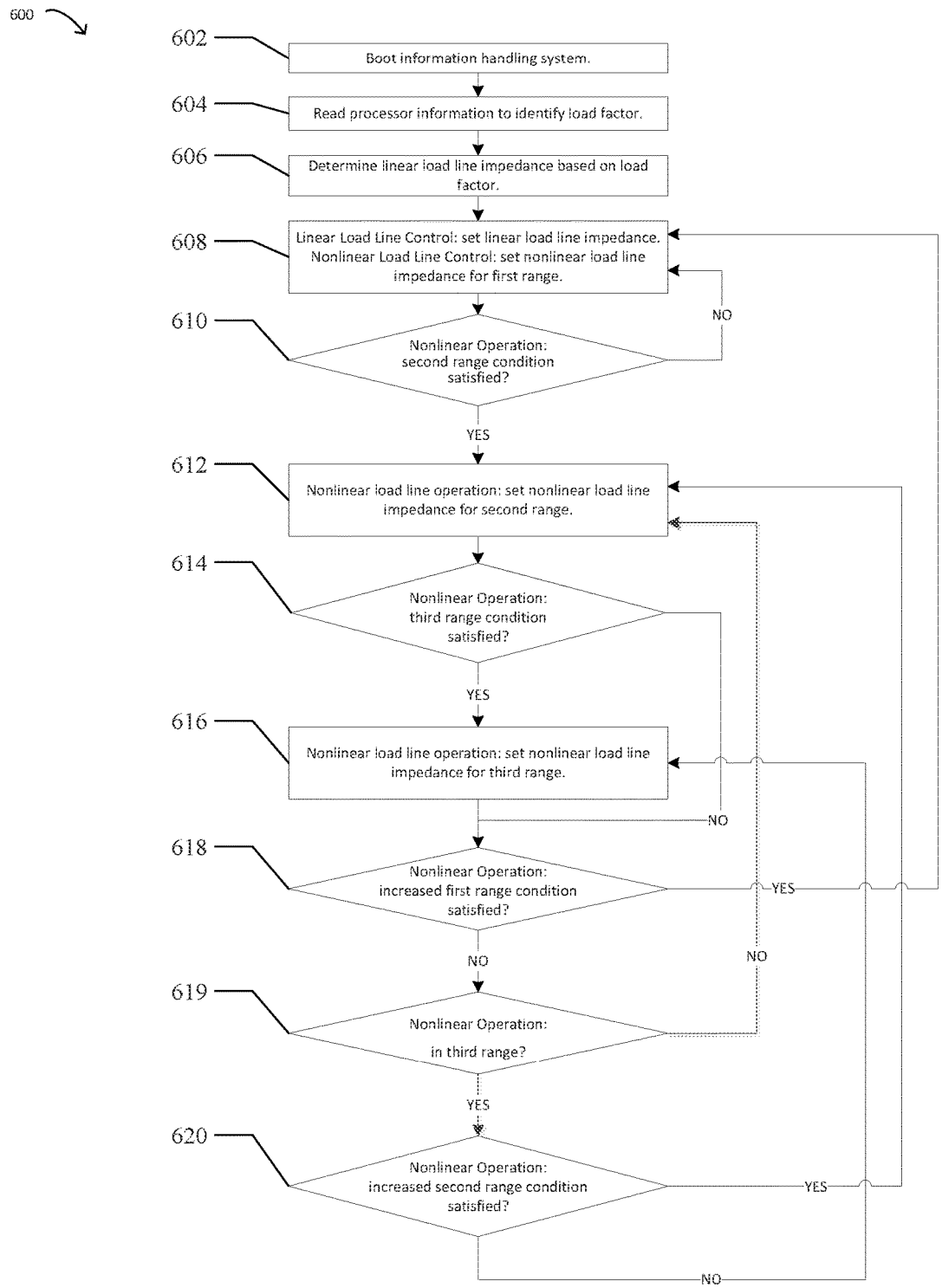
FIG. 6 is a block diagram of a method for intelligent load line control, in accordance with embodiments of the present disclosure.

Referring now to FIG. 6, a block diagram of a method 600 for intelligent load line control is shown, in accordance with embodiments of the present disclosure. Method 600 may be implemented by any of the elements shown in FIGS. 1-5. Method 600 may be initiated by any suitable criteria and may initiate operation at any suitable point. In one embodiment, method 600 may initiate operation at 602. Method 600 may include greater or fewer steps than those illustrated. Moreover, method 600 may execute its steps in an order that is different than those illustrated below. Method 600 may terminate at any suitable step. Moreover, method 600 may repeat operation at any suitable step. Portions of method 600 may be performed in parallel and repeat with respect to other portions of method 600.

At 602, an information handling system may be booted. Booting may include power on, boot, and reboot. At 604, the processor information may be read from the processor subsystem and may be used to identify a load factor. In one embodiment, identification may include one or more load factors, including but not limited to the type of processor subsystem, the thermal design envelope of the processor subsystem, the type of socket used by the processor subsystem, the number of processing cores of the processor subsystem, or the number of graphics cores of the processor subsystem. The identification may be read by a device reading the processor information read-only memory (ROM). In one embodiment, this device may be EC 180.

At 606, the linear load line impedance may be determined based on the load factor. For example, a processor with a thermal design envelope of 150 Watts may have a linear load line impedance of 1.0 mΩ. At 608, the linear load line impedance may be set in the voltage regulator subsystem. Setting the load line may require writing to a register in the voltage controller or adaptive voltage positioning logic unit. Setting the voltage, for example, may take one clock cycle of the voltage controller or approximately 40 nanoseconds. The voltage regulator subsystem may operate with linear load line control once a linear load line impedance is set.

At 610, method 600 may determine whether a second range condition associated with a second range of load currents of nonlinear load line operation is satisfied. If such a condition is satisfied, method 600 may proceed to step 612. Otherwise, no such condition is satisfied, and method 600 may proceed to step 608. Step 608 may skip re-setting the linear load line impedance if it is the current impedance set in the voltage controller. The second range condition may be any one of a variety of conditions, and may include a measured load current less than a load current threshold, a measured load current less than a hysteresis load current threshold, a reduced VID value, and/or a reduced power state. The second range of load currents of nonlinear load line operation may be represented by range 311 or 312. Moreover, the second range of load currents of nonlinear load line operation may represent load currents less than the first range of load currents.

A load current threshold may correspond to a second range. A measured load current less than the load current threshold may satisfy the second range condition. For example, a measured load current of 80 Amps may satisfy the second range condition if the load current threshold is 90 Amps. A hysteresis load current threshold may be determined as described in FIG. 5A, in which the hysteresis factor a may be predetermined and the load current $I_{dthreshold2}$ may be predetermined. The hysteresis load current threshold may correspond to a second range. A measured load current less than the hysteresis load current threshold may satisfy the second range condition.

A reduced VID value may be determined by comparing the current converted VID value to a previous converted VID value. The VID values may be converted into a requested voltage. A current requested voltage less than a previous requested voltage may satisfy the second range condition. In one embodiment, intelligent load line logic unit 266 may interface with adaptive voltage positioning logic unit 268 to determine both the current requested voltage and the previous requested voltage. In another embodiment, intelligent load line logic unit 266 may interface with adaptive voltage position logic unit 268 to determine the current requested voltage or VID, and may store the current requested voltage for comparison to determine whether a current value is greater than, less than, or equal to the previous value. In a further embodiment, intelligent load line logic unit 266 may receive the encoded VID, decode the VID into a requested voltage, and store the current requested voltage for comparison to determine whether a current value is greater than, less than, or equal to the previous value.

A reduced power state value may be determined by comparing the current power state value to a previous power state value. In some embodiments, processor subsystem 120 communicates with voltage regulator subsystem 110 to indicate the appropriate power state. In other embodiments, EC 180 may interface with processor subsystem 120 to query the relevant power state information. Relevant power state information may include global power states, system power states, core power states, processor power states, and/or power level states. A current power state value less than the previous power state value may satisfy the second range condition. A power state may be converted or decoded to determine the corresponding power state or power capability value. A power state corresponding to processor subsystem requiring more power will have a higher power state or power capability value. For example, a first power state designator may correspond to a maximum capability of requiring 10 Watts of power, while a second power state designator may correspond to a maximum capability of requiring 100 Watts of power. In that scenario, the first power state designator may be said to have a power state less than the second power state designator. However, the first power state designator may also be defined to have a power state greater than the second power state designator. In one embodiment, intelligent load line logic unit 266 may interface with adaptive voltage positioning logic unit 268 to determine both the current power state value and the previous power state value. In another embodiment, intelligent load line logic unit 266 may interface with adaptive voltage positioning logic unit 268 to determine the current power state value, and may store the current power state value for comparison to determine whether a current power state value is greater than, less than, or equal to a previous power state value. In a further embodiment, intelligent load line logic unit 266 may receive the encoded power state, decode the value into a requested power state, and store the current requested power state for comparison to determine whether the current power state value is greater than, less than, or equal to a previous power state value.

At 612, nonlinear load line control for a second range may be enabled, by setting nonlinear load line impedance for a second range. Setting the load line may require writing to a register in the voltage controller or adaptive voltage positioning logic unit. The voltage controller may operate in a second range of nonlinear load line control after the associated impedance is set. At 614, method 600 may determine whether a third range condition associated with a third range of nonlinear load line operation is satisfied. If such a condition is satisfied, method 600 may proceed to step 616. Otherwise, no such condition is satisfied, and method 600 may proceed to step 618. The third range condition may be similar to the second range condition and may include a measured load current less than a load current threshold or a measured load current less than a hysteresis load current threshold. In another embodiment, the third range condition may be any one of a variety of conditions, and may include a VID value associated with the third range of nonlinear load line control, or a power state value associated with the third range of nonlinear load line control. These associations may be implemented using an array or look up table, in which a specified VID or power state value may index the third range of nonlinear load line control. The third range of nonlinear load line operation may be represented by range 310. Moreover, the third range of nonlinear load line operation may represent load currents less than the second range and first range of load currents. As described above, method 600 may execute its steps in an order that is different than the order described. For example, the third range condition may be satisfied while in linear load line control. In this case, method 600 may proceed directly from step 608 to step 614.

A load current threshold current may correspond to a third range. A measured load current less than the load current threshold may satisfy the third range condition. For example, a measured load current of 40 Amps may satisfy the third range condition if the load current threshold is 50 Amps. A hysteresis load current threshold may be determined as described in FIG. 5A, in which the hysteresis factor c may be predetermined and the load current $I_{dthreshold3}$ may be predetermined. The hysteresis load current threshold may correspond to the third range. A measured load current less than the hysteresis load current threshold may satisfy the third range condition.

At 616, nonlinear load line control for the third range may be enabled, by setting a nonlinear load line impedance for a third range. Setting the load line may require writing to a register in the voltage controller or adaptive voltage positioning logic unit. The voltage controller may operate in a third range of nonlinear load line control after the associated impedance is set. In one embodiment, the third range of nonlinear load line control may have an associated impedance that is less than or equal to the impedance associated with the first range of nonlinear load line control. In another embodiment, the third range of nonlinear load line control may have an associated impedance that is greater than or equal to the impedance associated with the first range of nonlinear load line control.

At 618, method 600 may determine whether an increased first range condition associated with a first range of nonlinear load line operation is satisfied or whether a linear load line condition associated with the linear load line impedance is satisfied. The increased first range condition may correspond to an increase in load current from load current 518 to load current 520. If such a condition is satisfied, method 600 may proceed to step 608. Otherwise, no such condition is satisfied, and method 600 may proceed to step 619. Proceeding to step 608 may result in nonlinear load line operation in a first range or may result in linear load line operation. The condition associated with a first range of nonlinear load line operation or with linear load line operation may be any one of a variety of conditions, and may include a measured load current greater than a load current threshold, a measured load current greater than a hysteresis load current threshold, an output voltage excursion, a measured derivative of voltage greater than a threshold, an increased VID value, and an increased power state value. The first range of nonlinear load line operation may be represented by range 314.

A load current threshold may correspond to a load current range for the first range. A measured load current greater than the load current threshold may satisfy the increased first range condition. For example, a measured load current of 91 Amps may satisfy the increased first range condition if the load current threshold is 90 Amps. A hysteresis load current threshold may be predetermined as described in FIG. 5B, in which the hysteresis factor d may be predetermined and the load current $I_{sthreshold}$ may be predetermined. The hysteresis load current threshold may correspond to a first range of nonlinear load line control or a load current range for the linear load line. A measured load current greater than the hysteresis load current threshold satisfy the increased first range condition. For example, a measured load current of 101 Amps may not satisfy the condition if the hysteresis factor is 1.1 and the load current threshold is 100 Amps because the hysteresis load current threshold is 110 Amps. However, a measured load current of 111 Amps may satisfy the condition with the same hysteresis load current threshold of 110 Amps.

An output voltage excursion may be determined by measuring the output voltage and performing one or more comparisons. In one embodiment, the absolute value of the difference between the measured output voltage and the expected output voltage may be compared to an offset threshold. If the absolute value is greater than the offset, the condition for a first range of nonlinear load line control or for linear load line control may be satisfied. In another embodiment, the measured output voltage may be compared to both a maximum voltage and a minimum voltage. If the measured output value is greater than the maximum voltage or less than the minimum voltage, the condition for a first range of nonlinear load line control or for linear load line control may be satisfied. The maximum voltage may be equivalent to the absolute maximum voltage for the processor, and the minimum voltage may be equivalent to the absolute minimum voltage for the processor. In a further embodiment, the measured output voltage may be compared to a tolerance in relation to a linear load line. The measured load current may be used to calculate the expected linear load line voltage using Equation (1). The absolute value of the difference between the measured output voltage and the expected linear load line voltage may be compared to a tolerance offset. If the absolute value is greater than the tolerance offset, the condition for a first range of nonlinear load line control or for linear load line control may be satisfied.

A derivative of the output voltage may also be compared. The output voltage may be measured and compared to a previous output voltage, measured on a previous update of the voltage controller. If the absolute value of the difference between the measured output voltage and the previous output voltage is greater than a threshold, the condition for a first range of nonlinear load line control or for linear load line control may be satisfied. For example, a threshold may be 30 mV where a measured output voltage of 1.85V and a previous output voltage of 1.8V would correspond to an absolute difference of 50 mV. In this scenario, the condition for a first range of nonlinear load line control or for linear load line control may be satisfied because the absolute difference of 50 mV is greater than the threshold of 30 mV.

An increased VID value may be determined by comparing the current converted VID value to a previous converted VID value. The VID values may be converted into a requested voltage. A current requested voltage greater than the previous requested voltage may satisfy the condition for a first range of nonlinear load line control or for linear load line control. In one embodiment, intelligent load line logic unit 266 may interface with adaptive voltage positioning logic unit 268 to determine both the current requested voltage and the previous requested voltage. In another embodiment, intelligent load line logic unit 266 may interface with adaptive voltage position logic unit 268 to determine the current requested voltage or VID, and may store the current requested voltage for comparison to determine if a current value is greater than, less than, or equal to the previous value. In a further embodiment, intelligent load line logic unit 266 may receive the encoded VID, decode the VID into a requested voltage, and store the current requested voltage for comparison to determine if a current value is greater than, less than, or equal to the previous value.

An increased power state value may be determined by comparing the current power state value to a previous power state value. A current power state value greater than the previous power state value may satisfy the condition for a first range of nonlinear load line control or for linear load line control. In one embodiment, intelligent load line logic unit 266 may interface with adaptive voltage positioning logic unit 268 to determine both the current power state value and the previous power state value. In another embodiment, intelligent load line logic unit 266 may interface with adaptive voltage positioning logic unit 268 to determine the current power state value, and may store the current power state value for comparison to determine if a current power state value is greater than, less than, or equal to a previous power state value. In a further embodiment, intelligent load line logic unit 266 may receive the encoded power state, decode the value into a requested power state, and store the current power state value for comparison to determine if a current power state value is greater than, less than, or equal to a previous power state value.

At 619, method 600 may determine whether nonlinear load line operation is in the third range. The third range may correspond to range 310. If operating in the third range, method 600 may proceed to step 620. Otherwise, method 600 may proceed to method step 612. Step 612 may skip re-setting the nonlinear load line impedance for a second range if it is the current impedance already set in the voltage controller. At 620, method 600 may determine whether an increased second range condition associated with the second range of nonlinear load line operation is satisfied. The increased second range condition may correspond to an increase in load current from load current 516 to load current 518. If such a condition is satisfied, method 600 may proceed to step 612. Otherwise, no such condition is satisfied, and method 600 may proceed to step 616. Step 616 may skip re-setting the nonlinear load line impedance for a third range if it is the current impedance already set in the voltage controller. The increased second range condition may be any one of a variety of conditions, and may include a measured load current greater than a load current threshold, a measured load current greater than a hysteresis load current threshold and an output voltage excursion. In another embodiment, the condition may be any one of a variety of conditions, and may include a VID value associated with the second range of nonlinear load line control, or a power state value associated with the second range of nonlinear load line control. These associations may be implemented using an array or look up table, in which a specified VID or power state value may index the second range of nonlinear load line control.

A load current threshold may correspond to a second range. A measured load current greater than the load current threshold may satisfy the increased second range condition. For example, a measured load current of 51 Amps may satisfy the condition if the load current threshold is 50 Amps. A hysteresis load current threshold and the load current may both be predetermined as described in FIG. 5B, in which the hysteresis factor b may be predetermined and the load current $I_{dthreshold2}$ may be predetermined. The hysteresis load current threshold may correspond to a second range. A measured load current greater than the hysteresis load current threshold may satisfy the increased second range condition. For example, a measured load current of 51 Amps may not satisfy the condition if the hysteresis factor is 1.2 and the load current threshold is 50 Amps because the hysteresis load current threshold would be 60 Amps. However, a measured load current of 61 Amps may satisfy the condition with the same hysteresis load current threshold of 60 Amps.

As disclosed herein, intelligent load line control may reside in an embedded controller of an information handling system, may be communicatively coupled to an embedded controller of an information handling system, or may reside in a voltage controller subsystem of an information handling system. The intelligent load line controller may generate an appropriate load line impedance for a measured load current, a requested VID, or requested power state. Moreover, intelligent load line controller may respond instantaneously relative to voltage controller subsystem loop bandwidth.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of intelligent load line control comprising:
    enabling linear load line control by setting a linear load line impedance, wherein the linear load line impedance is based on a load factor of a processor subsystem;
    determining that a second range condition corresponding to a second range nonlinear load line impedance is satisfied, wherein the second range nonlinear load line impedance is greater than or equal to both the linear load line impedance and a first range nonlinear load line impedance; and
    enabling nonlinear load line control by setting the second range nonlinear load line impedance based on the determination that the second range condition is satisfied, wherein nonlinear load line control with the second range nonlinear load line impedance has a first piecewise linear response.

2. The method of claim 1, wherein the second range condition is satisfied by:
    measuring a load current of the processor subsystem;
    computing a hysteresis load limit based on a load current threshold and a hysteresis factor; and
    determining that the measured load current is less than the hysteresis load limit.

3. The method of claim 1, wherein the second range condition is satisfied by:
    receiving a requested power value;
    converting the requested power value into a power capability value; and
    determining that the power capability value is less than a previous power capability value.

4. The method of claim 1, further comprising:
    determining that a third range condition corresponding to a third range nonlinear load line impedance is satisfied, wherein the third range nonlinear load line impedance is greater than or equal to the second range nonlinear load line impedance; and
    setting the third range nonlinear load line impedance based on the determination that the third range condition is satisfied, wherein nonlinear load line control with the third range nonlinear load line impedance has a second piecewise linear response different from the first piecewise linear response.

5. The method of claim 1, further comprising:
    determining that an increased first range condition corresponding to the first range nonlinear load line impedance is satisfied, wherein the first range nonlinear load line impedance is less than the second range nonlinear load line impedance; and
    setting the first range nonlinear load line impedance based on the determination that the increased first range condition is satisfied, wherein nonlinear load line control with the first range nonlinear load line impedance has a third piecewise linear response different from the first piecewise linear response and the second piecewise linear response.

6. The method of claim 5, wherein the increased first range condition is satisfied by:
   measuring a load current of the processor subsystem;
   computing a hysteresis load limit based on a load current threshold and a hysteresis factor; and
   determining that the measured load current is greater than the hysteresis load limit.

7. The method of claim 5, wherein the increased first range condition is satisfied by:
   receiving a requested power value;
   converting the requested power value into a power capability value; and
   determining that the power capability value is greater than a previous power capability value.

8. An information handling system, comprising:
   a processor subsystem having access to a first memory;
   an embedded controller comprising a secondary processor having access to a second memory, the second memory storing instructions executable by the secondary processor to:
      read information from the processor subsystem to identify a load factor;
      determine a linear load line impedance based on the load factor;
      enable linear load line control by setting the linear load line impedance in a voltage regulator subsystem;
      determine that a second range condition corresponding to a second range nonlinear load line impedance is satisfied, wherein the second range nonlinear load line impedance is greater than or equal to both the linear load line impedance and a first range nonlinear load line impedance; and
      enable nonlinear load line control by setting the second range nonlinear load line impedance based on the determination that the second range condition is satisfied, wherein nonlinear load line control with the second range nonlinear load line impedance has a first piecewise linear response.

9. The information handling system of claim 8, wherein the instructions to determine that the second range condition is satisfied include:
   receive a measured load current from the voltage regulator subsystem;
   compute a hysteresis load limit based on a load current threshold and a hysteresis factor; and
   determine that the measured load current is less than the hysteresis load limit.

10. The information handling system of claim 8, wherein the instructions to determine that the second range condition is satisfied include:
    receive a requested power value;
    convert the requested power value into a power capability value; and
    determine that the power capability value is less than a previous power capability value.

11. The information handling system of claim 8, further storing instructions to:
    determine that a third range condition corresponding to a third range nonlinear load line impedance is satisfied, wherein the third range nonlinear load line impedance is greater than or equal to the second range nonlinear load line impedance; and
    set the third range nonlinear load line impedance based on the determination that the third range condition is satisfied, wherein nonlinear load line control with the third range nonlinear load line impedance has a second piecewise linear response different from the first piecewise linear response.

12. The information handling system of claim 8, further storing instructions to:
    determine that an increased first range condition corresponding to the first range nonlinear load line impedance is satisfied, wherein the first range nonlinear load line impedance is less than the second range nonlinear load line impedance; and
    set the first range nonlinear load line impedance based on the determination that the first range condition is satisfied, wherein nonlinear load line control with the first range nonlinear load line impedance has a third piecewise linear response different from the first piecewise linear response and the second piecewise linear response.

13. The information handling system of claim 12, wherein the instructions to determine that the increased first range condition is satisfied include:
    receive a measured load current from the voltage regulator subsystem;
    compute a hysteresis load limit based on a load current threshold and a hysteresis factor; and
    determine that the measured load current is greater than the hysteresis load limit.

14. The information handling system of claim 12, wherein the instructions to determine that the increased first range condition is satisfied include:
    receive a requested power value;
    convert the requested power value into a power capability value; and
    determine that the relative power capability value is greater than a previous power capability value.

15. A voltage regulator for delivering power to a processor subsystem within an information handling system, comprising:
    an interface to an embedded controller for receiving a linear load line impedance based on a load factor determined by information read from the processor subsystem;
    an intelligent load line controller including circuitry to:
       enable linear load line control by setting the linear load line impedance and to determine a first range nonlinear load line impedance corresponding to the linear load line impedance;
       determine that a second range condition corresponding to a second range nonlinear load line impedance is satisfied, wherein the second range nonlinear load line impedance is greater than or equal to both the linear load line impedance and the first range nonlinear load line impedance; and
       enable nonlinear load line control by setting the second range nonlinear load line impedance based on the determination that the second range condition is satisfied, wherein nonlinear load line control with the second range nonlinear load line impedance has a first piecewise linear response.

16. The voltage regulator of claim 15, wherein the intelligent load line controller determines that the second range condition is satisfied by:
    receiving the measured load current from a current logic unit;
    computing a hysteresis load limit based on a load current threshold and a hysteresis factor; and determining that the measured load current is less than the hysteresis load limit.

17. The voltage regulator in claim 15, further comprising:
an adaptive voltage positioning logic unit including circuitry to:
  receive a requested power value from the processor subsystem; and
  relay the requested power value to the intelligent load line controller; and
wherein the intelligent load line controller determines that the second range condition is satisfied by:
  converting the requested power value into a power capability value; and
  determining that the power capability value is less than the previous power capability value.

18. The voltage regulator of claim 15, wherein the intelligent load line controller further includes circuitry to:
  determine that a third range condition corresponding to a third range nonlinear load line impedance is satisfied, wherein the third range nonlinear load line impedance is greater than or equal to the second range nonlinear load line impedance; and
  set the third range nonlinear load line impedance based on the determination that the third range condition is satisfied, wherein nonlinear load line control with the third range nonlinear load line impedance has a second piecewise linear response different from the first piecewise linear response.

19. The voltage regulator of claim 15, wherein the intelligent load line controller further includes circuitry to:
  determine that an increased first range condition is satisfied, wherein the first range nonlinear load line impedance is less than the second nonlinear load line impedance; and
  set the first range nonlinear load line impedance based on the determination that the increased first range condition is satisfied, wherein nonlinear control with the first range nonlinear load line impedance has a third piecewise linear response different from the first piecewise linear response and the second piecewise linear response.

20. The voltage regulator of claim 19, further comprising:
an adaptive voltage positioning logic unit including circuitry to:
  receive a requested power value from the processor subsystem; and
  relay the requested power value to the intelligent load line controller; and
wherein the intelligent load line controller determines that the increased first range condition is satisfied by:
  converting the requested power value into a power capability value; and
  determining that the power capability value is greater than the previous power capability value.

* * * * *